United States Patent
Kuntze et al.

(10) Patent No.: US 11,634,013 B2
(45) Date of Patent: Apr. 25, 2023

(54) LIFTGATE REINFORCEMENT ARRANGEMENTS

(71) Applicants: MAGNA EXTERIORS INC., Concord (CA); Christopher Kuntze, Goodrich, MI (US)

(72) Inventors: Christopher Kuntze, Goodrich, MI (US); Paul Woodson, Warren, MI (US); Riad Chaaya, Clarkston, MI (US); Mike Pabian, Washington Township, MI (US)

(73) Assignee: MAGNA EXTERIORS, INC., Concord (CA)

( * ) Notice: Subject to any disclaimer, the term of this patent is extended or adjusted under 35 U.S.C. 154(b) by 566 days.

(21) Appl. No.: 16/621,530

(22) PCT Filed: Jun. 29, 2018

(86) PCT No.: PCT/US2018/040242
§ 371 (c)(1),
(2) Date: Dec. 11, 2019

(87) PCT Pub. No.: WO2019/006271
PCT Pub. Date: Jan. 3, 2019

(65) Prior Publication Data
US 2020/0114739 A1 Apr. 16, 2020

Related U.S. Application Data

(60) Provisional application No. 62/527,569, filed on Jun. 30, 2017.

(51) Int. Cl.
*B60J 5/10* (2006.01)
*B29C 45/14* (2006.01)
(Continued)

(52) U.S. Cl.
CPC ......... *B60J 5/107* (2013.01); *B29C 45/14065* (2013.01); *B60S 1/583* (2013.01);
(Continued)

(58) Field of Classification Search
CPC ..... B60J 5/107; B60J 5/044; B29L 2031/3041
(Continued)

(56) References Cited

U.S. PATENT DOCUMENTS

| 5,487,941 A | 1/1996 | Pepin |
| 6,220,652 B1 * | 4/2001 | Browne ............ B60J 5/044 49/502 |

(Continued)

FOREIGN PATENT DOCUMENTS

| CN | 108312816 A | * 7/2018 | .............. B60J 5/107 |
| JP | 2010159037 A | 7/2010 | |

(Continued)

OTHER PUBLICATIONS

European Search Report for Application No. 20211245.2-1015 dated Mar. 11, 2022.
(Continued)

*Primary Examiner* — Jason S Morrow
*Assistant Examiner* — Wenwei Zhuo
(74) *Attorney, Agent, or Firm* — Warn Partners, P.C.

(57) ABSTRACT

A liftgate structure having a structural inner panel with an outside surface and an inner surface having a lower perimeter surface area extending across substantially the entire width of the structural inner panel. The structural inner panel includes a wiper motor housing recess formed on the inner surface. A plurality of brackets are connected to the outside surface of the structural inner panel, where each of the brackets has at least one friendly hole. The liftgate structure further includes a tether having 2 ends each having at least one over molded retainer for connecting the tether to a wiper (Continued)

motor housing positioned within the wiper motor housing recess of the structural inner panel. Additionally the tether is positioned through each of the at least one friendly holes of the plurality of brackets.

15 Claims, 11 Drawing Sheets

(51) Int. Cl.
*B60S 1/58* (2006.01)
*B29L 31/30* (2006.01)

(52) U.S. Cl.
CPC .............. *B29C 2045/14147* (2013.01); *B29L 2031/3041* (2013.01)

(58) Field of Classification Search
USPC .......................... 296/146.6, 146.8, 146.5, 56
See application file for complete search history.

(56) References Cited

U.S. PATENT DOCUMENTS

| | | | |
|---|---|---|---|
| 2010/0052360 A1* | 3/2010 | Hsu | B60R 21/0428 296/146.5 |
| 2017/0174057 A1* | 6/2017 | Miyake | B60S 1/0441 |
| 2020/0164929 A1* | 5/2020 | Kuntze | B60J 5/101 |
| 2020/0354890 A1* | 11/2020 | Kitamura | B29C 48/2883 |
| 2021/0283999 A1* | 9/2021 | Harney | B60J 5/107 |
| 2021/0347235 A1* | 11/2021 | Kuntze | B60J 5/107 |

FOREIGN PATENT DOCUMENTS

| | | |
|---|---|---|
| JP | 2015006826 A | 1/2015 |
| WO | 2009143627 A1 | 12/2009 |
| WO | WO-2021211987 A1 * | 10/2021 ............. B60J 5/101 |

OTHER PUBLICATIONS

European Office Action for Application No. 18785468.2, dated Dec. 8, 2020.

\* cited by examiner

LIFTGATE REINFORCEMENT ARRANGEMENTS

CROSS-REFERENCE TO RELATED APPLICATIONS

This application claims the benefit of U.S. Provisional Application No. 62/527,569, filed Jun. 30, 2017. The disclosure of the above application is incorporated herein by reference.

FIELD OF THE INVENTION

The present invention relates to a tether component and method of manufacturing the tether component, which is implemented in a liftgate for an automobile.

BACKGROUND OF THE INVENTION

One of the current trends in the automobile industry is to lower vehicle weight to help achieve better fuel economy, thus helping to meet fuel economy standards and to offset the higher fuel prices. Another trend is that there is a broader range of vehicle models, which in turn reduces the volume of vehicles produced on a per model basis. Liftgates are traditionally made from stamped steel panels that are heavy and have a high tooling cost and are susceptible to corrosion. Sheet Molding Compound (SMC) is an alternative to steel for the inner and outer panels of the liftgate. Using SMC has several manufacturing concerns related to the material and process. Steel and SMC liftgates have a mass penalty over thermoplastics. There are also styling restrictions with traditional sheet metal and SMC components.

In certain applications where liftgates are made from composite materials, tethers made from steel are used to strengthen the liftgate. The use of steel tethers can be difficult to attach and increase the assembly complexity. It is therefore desirable to design liftgates that have tether systems that are easier to assemble, require less attachment points and still provide the desired level of strength to the liftgate.

It is therefore desirable to develop and provide a new tether that has a stronger attachment clip that is over molded to the fibers of the tether in such a way that the integrity and strength of the individual fibers is preserved. It is further a desirable to provide a tether system that is flexible and is connected to the liftgate panel through apertures thereby reducing the number of physical anchor points used. It is also desirable to provide a tether system that allows the installed tether to have slack at each aperture that allows for the tether to avoid damage to the tether upon impact.

SUMMARY OF THE INVENTION

The present invention is directed to a liftgate structure for an automobile that is preferably formed from composite material. The liftgate structure includes a structural inner panel with an outside surface and an inner surface having a lower perimeter surface area extending across substantially the entire wide of the structural inner panel. The lower perimeter surface area in some applications is where additional structures such as door latches, window actuators and window wiper motors are mounted. As described herein the structural inner panel includes a wiper motor housing recess formed on the inner surface.

The structural inner panel also includes a plurality of brackets connected on the outside surface used for providing additional mounting and strengthening structure to the structural inner panel. Also the plurality of brackets each include at least one friendly hole used for loosely interweaving a tether to each of the plurality of brackets.

The tether has two ends each having at least one over molded retainer for connecting the tether to a wiper motor housing that is connected to the wiper motor housing recess. The tether is positioned through each of the friendly holes of each of the plurality of brackets in a manner that there is slack in each length of tether extending between adjacent friendly holes. In the event of an accident, the structural inner panel can break into pieces and the slack helps to catch and hold fragments of structural inner panel located between the plurality of brackets. The slack also reduces the tension between the plurality of brackets that would be present if the tether did not have slack, which in some applications can cause smaller pieces to break from the structural inner panel since the tether would be tensioned between the plurality of brackets and apply unnecessary force brought on by the tether being taught rather than slacked.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
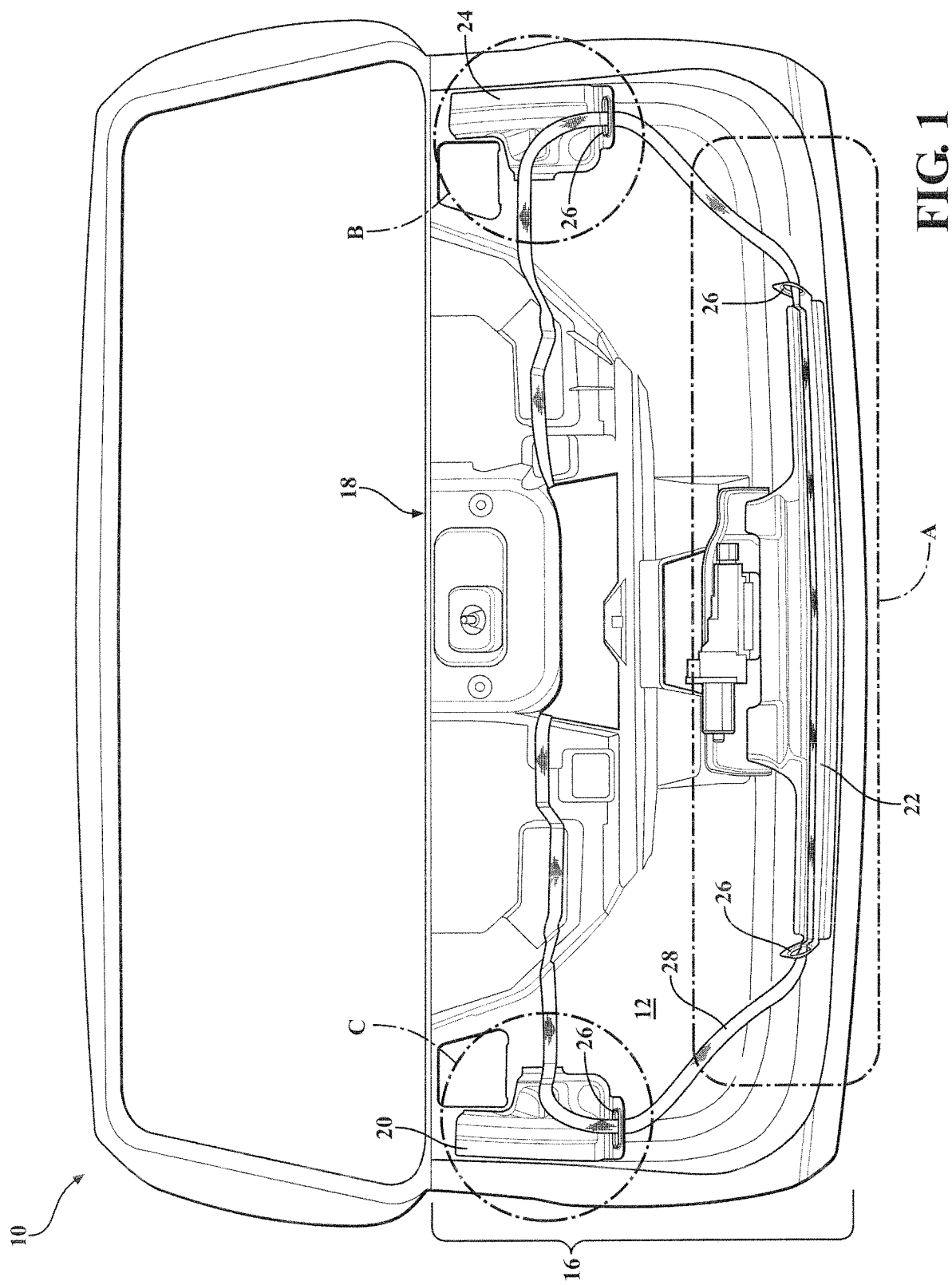
FIG. 1 is an end view of an outside surface of a structural inner panel of a liftgate, having the tether and brackets connected thereon.
Figure 2:
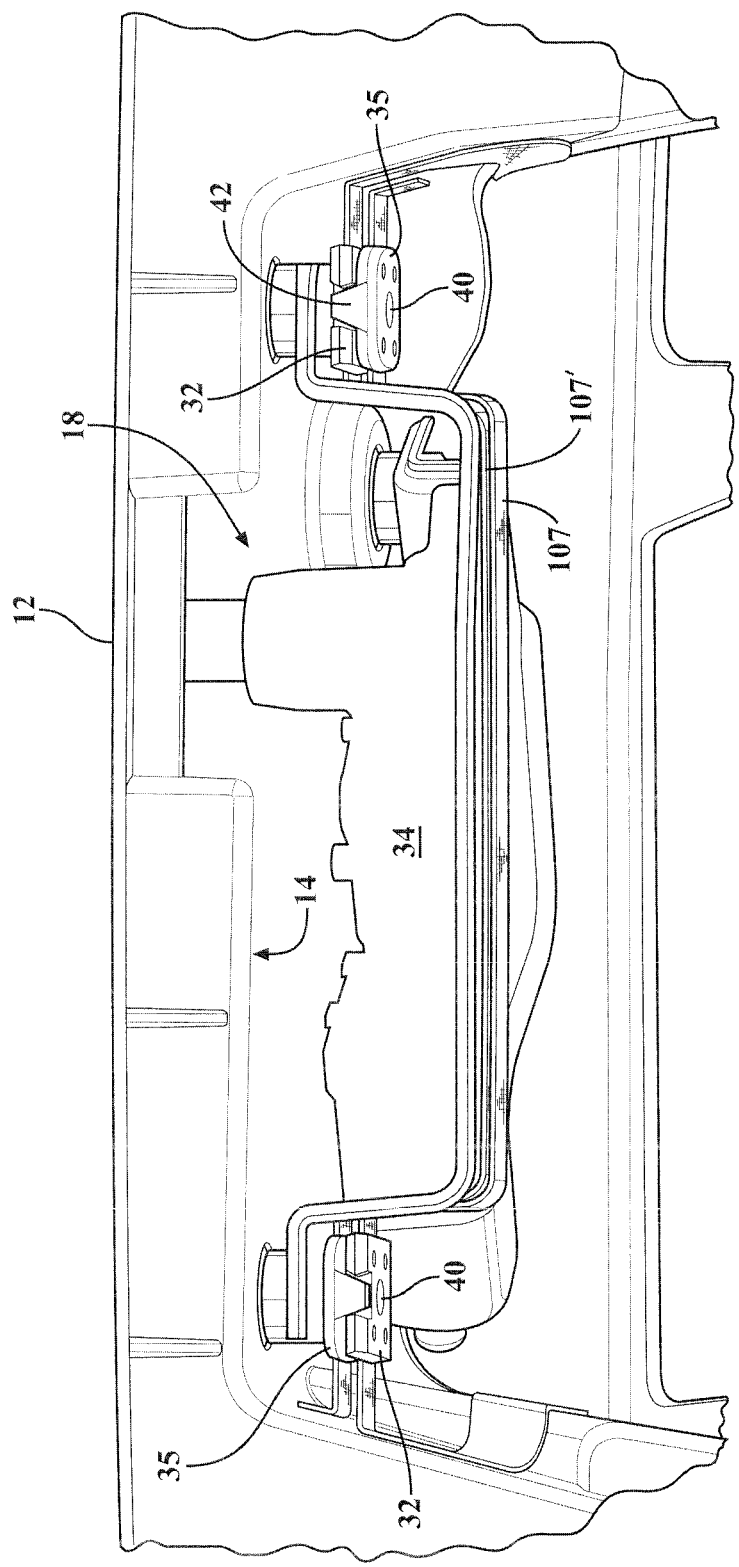
FIG. 2 is a top cross-sectional view of a wiper motor recess with wiper motor, bracket and tether connected.
Figure 3:
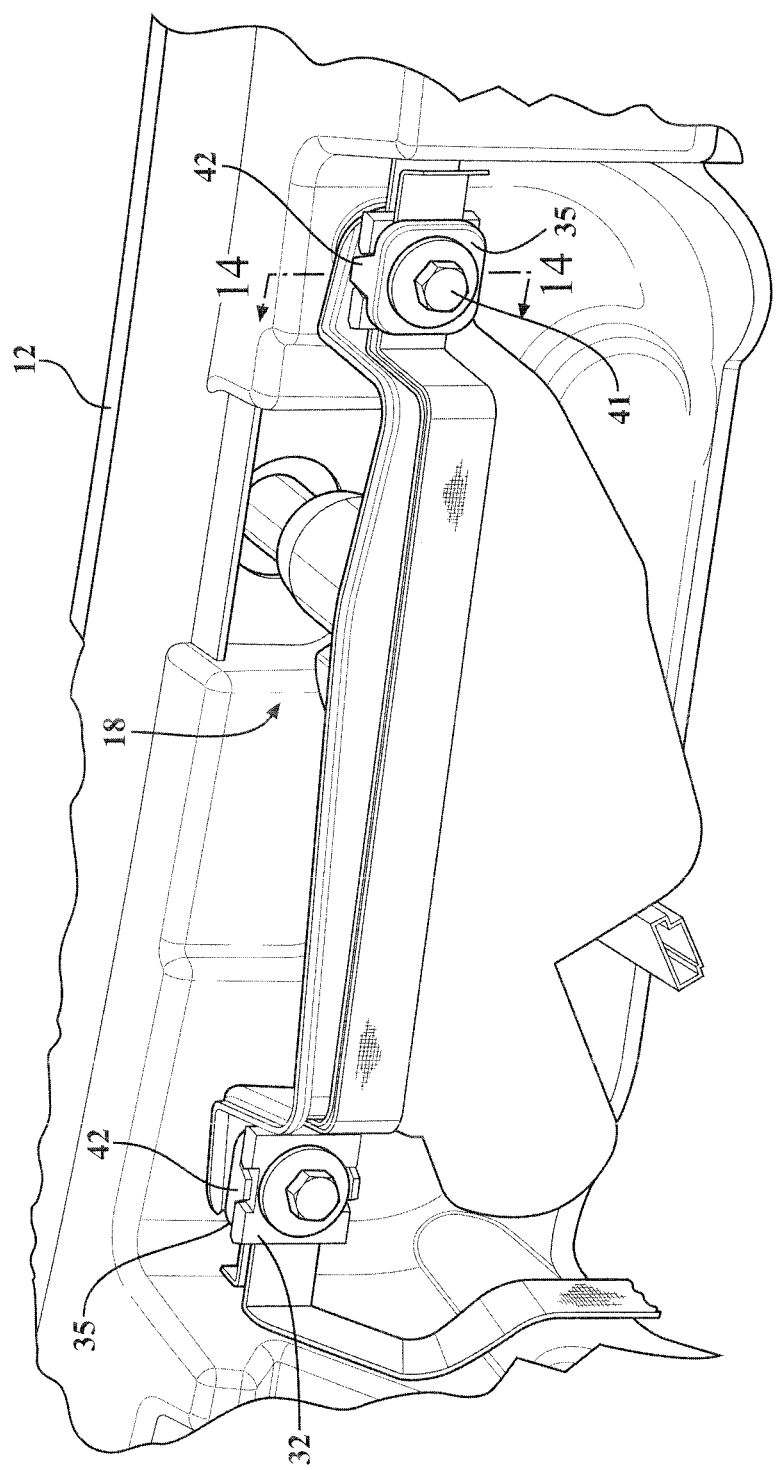
FIG. 3 is a side perspective view of the liftgate wiper motor recess with wiper motor, bracket and tether connected.
Figure 4:
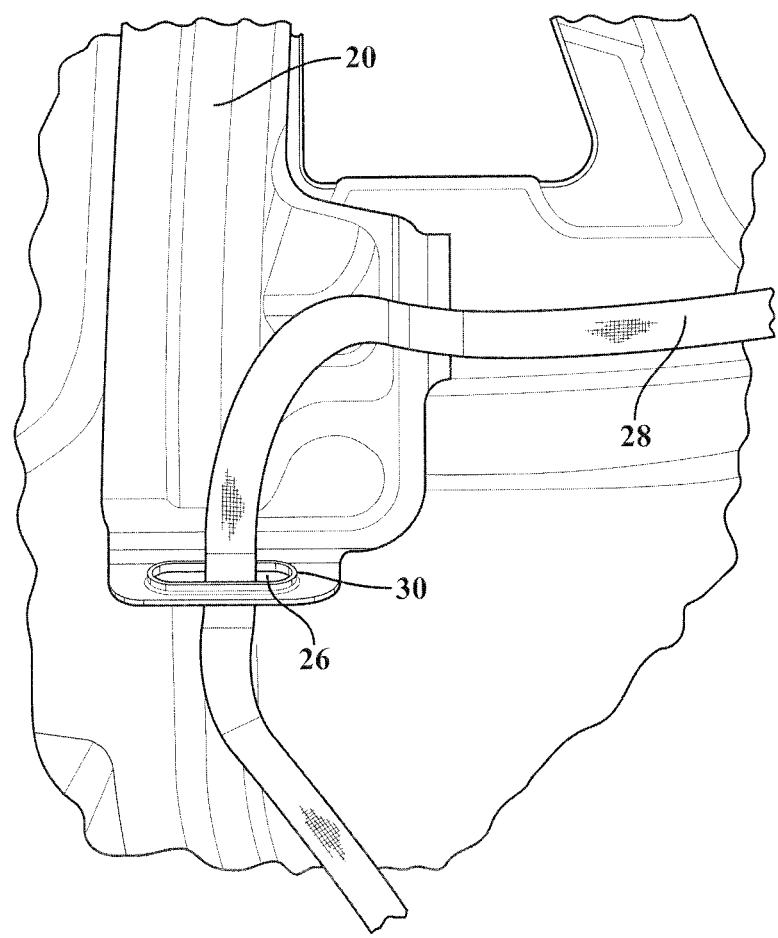
FIG. 4 is an end perspective view of a left side bracket and tether connected to the outside surface of the liftgate.
Figure 5:
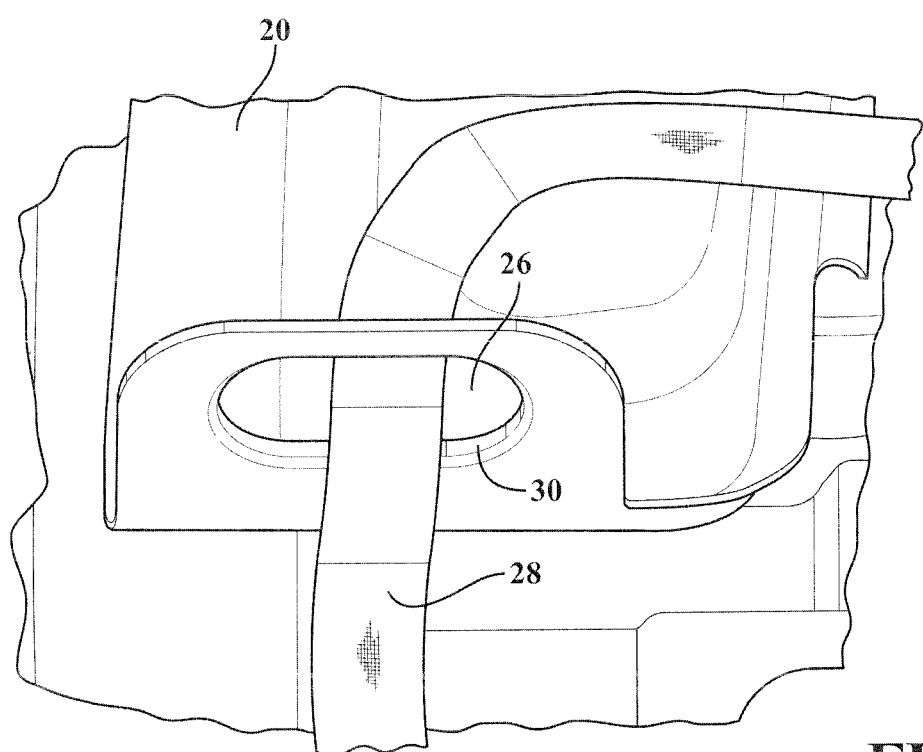
FIG. 5 is a bottom perspective view of a friendly hole of the left side bracket with a tether extending therethrough.
Figure 6:
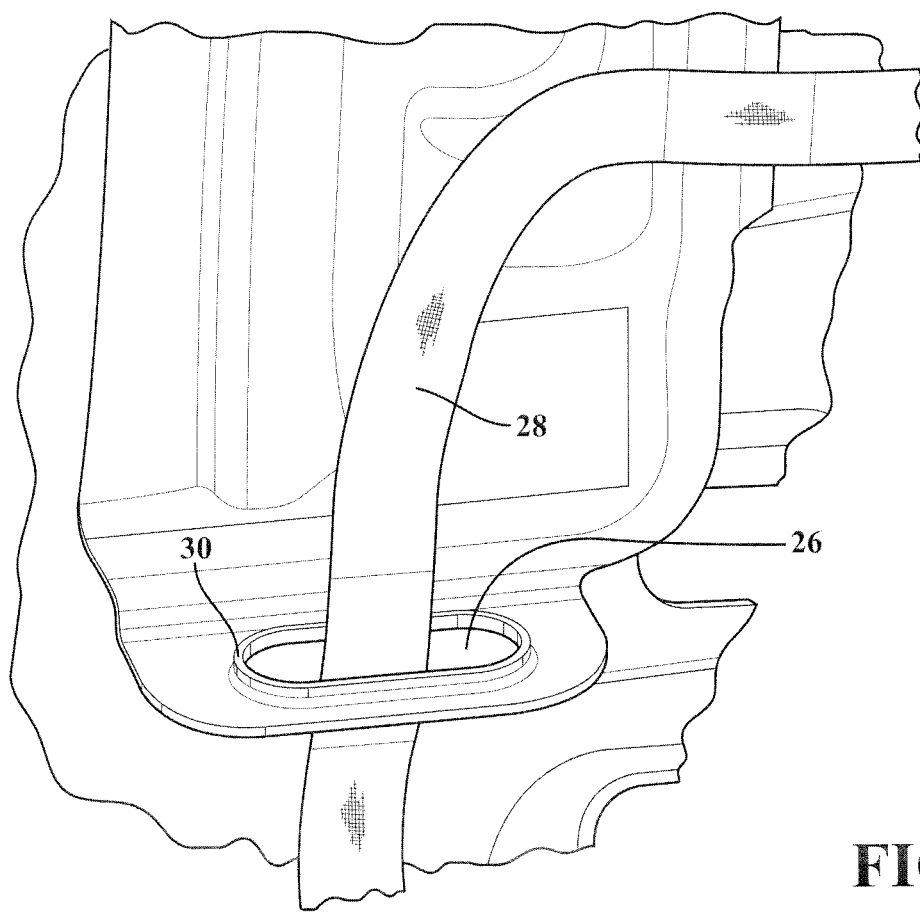
FIG. 6 is a top perspective view of a friendly hole of the left side bracket with a tether extending therethrough.
Figure 7:
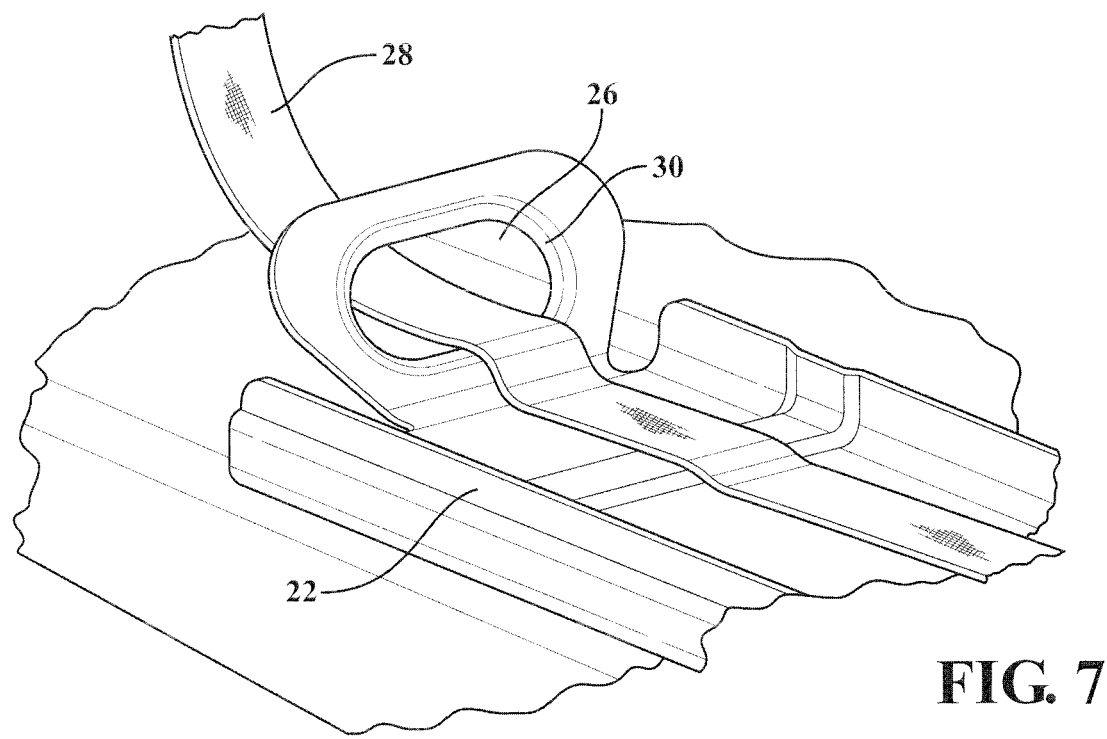
FIG. 7 is a top perspective view of a friendly hole of the middle lower bracket with a tether extending therethrough.

The following description of the preferred embodiment is merely exemplary in nature and is in no way intended to limit the invention, its application, or uses.

Referring now to FIGS. 1-7 there is shown a liftgate structure having a structural inner panel 10 with an outside surface 12 and an inner surface 14. The structural inner panel is covered by an outer panel or outer panels (not shown) that have an exterior show surface. The liftgate structure, and the structural inner panel 10 are made of composite material, however it is within the scope of this invention for different materials to be used such as aluminum, manufactured die-cast, metal, etc. The structural inner panel 10 has a lower perimeter surface area 16 extending across substantially the entire width of the structural inner panel 10. The structural inner panel 10 also includes a wiper motor housing recess 18 formed on the inner surface 14. Also included is a plurality of brackets including a left side bracket 20, a center lower bracket 22 and a right side bracket 24. It is within the scope of this invention for a greater or fewer number of brackets to be implemented depending on the particular application. The plurality of brackets are connected to the outside surface 12 of the structural inner panel 10. Each of the plurality of brackets also include one or more friendly holes 26, which are apertures through the respective brackets that allow for a tether 28 to pass through. As shown in FIGS. 4-7 the friendly holes 26 each have a curled edge 30 that creates a smooth edge to prevent any snagging of the tether 28 material.

The tether 28 includes two ends each having at least one over molded retainer 32 for connecting the tether 28 to a wiper motor housing 34 in the wiper motor housing recess 18. The tether 28 is positioned through each of the friendly holes 26 of each of the plurality brackets 20, 22, 24. While the present embodiment of the invention depicts the tether 28 as being routed through various bracket members, it is within the scope of this invention for the friendly holes 26, to be formed with the structural inner panel 10, thereby eliminating the need for different brackets 20, 22, 24. Additionally the placement of the brackets 20, 22, 24 are located in predetermined tether reinforcement zones A, B, C in FIG. 1, which are areas on the structural inner panel 10 that are determined to be structurally stronger areas of the liftgate than the portions of the inner panel not located in the tether reinforcement zones A, B, C. The tether reinforcement zones A, B, C are best for placement of connections for the tether 28. The structural reinforcement zones A, B, C allow for the tether 28 to span areas of the composite liftgates that are structurally weaker and will benefit from having the tether 28 passing across the weaker area to be connected to the tether reinforcement zones A, B, C of the liftgate. The location of the tether reinforcement zones can vary depending upon the design of the liftgate. Factors such as shape, material thickness, material makeup and the dimensions of the liftgate can have an effect on the location of the tether reinforcement zone. Routing the tether 28 between each tether reinforcement zones A, B, C causes the tether 28 to cross weaker areas of the liftgate to create a type of safety net that will hold the structural inner panel together in the event of breaking of the structural inner panel in the weaker areas between the tether reinforcement zones A, B, C.

When assembled the tether 28 has a significant amount of slack through each of the friendly holes 26 to allow the tether 28 to flex and move in the event of a crash that breaks the structural inner panel 10 into several pieces. The slack of the tether 28 allows for additional force absorption. The amount of slack is at least 1.5 cm between each tether reinforcement zones A, B, C. For example, the portion of tether 28 length extending from reinforcement zones A to B, B to C and C to A each have greater than or equal to 1.5 cm of slack in each respective length.

The tether 28 is made of a tether material that has elongated fiber strands (shown in FIG. 9) extending along the length of the tether in a parallel orientation. The elongated fiber strands 107 are held together by cross strands 105 (shown in FIG. 9), but the elongated fiber strands 107 are able to slide apart, which is helpful during the method of forming the over molded retainer 32 as discussed below. The elongated fiber strands 107 used can be any type of suitable fiber material, and include but are not limited to glass fibers, carbon fibers, metal strands and aramid fibers. It is also within the scope of this invention for the tether 28 to have a bright color, such as white, yellow or any other lighter color that will allow for easier visual inspection of the assembled liftgate structure.

Figure 14:
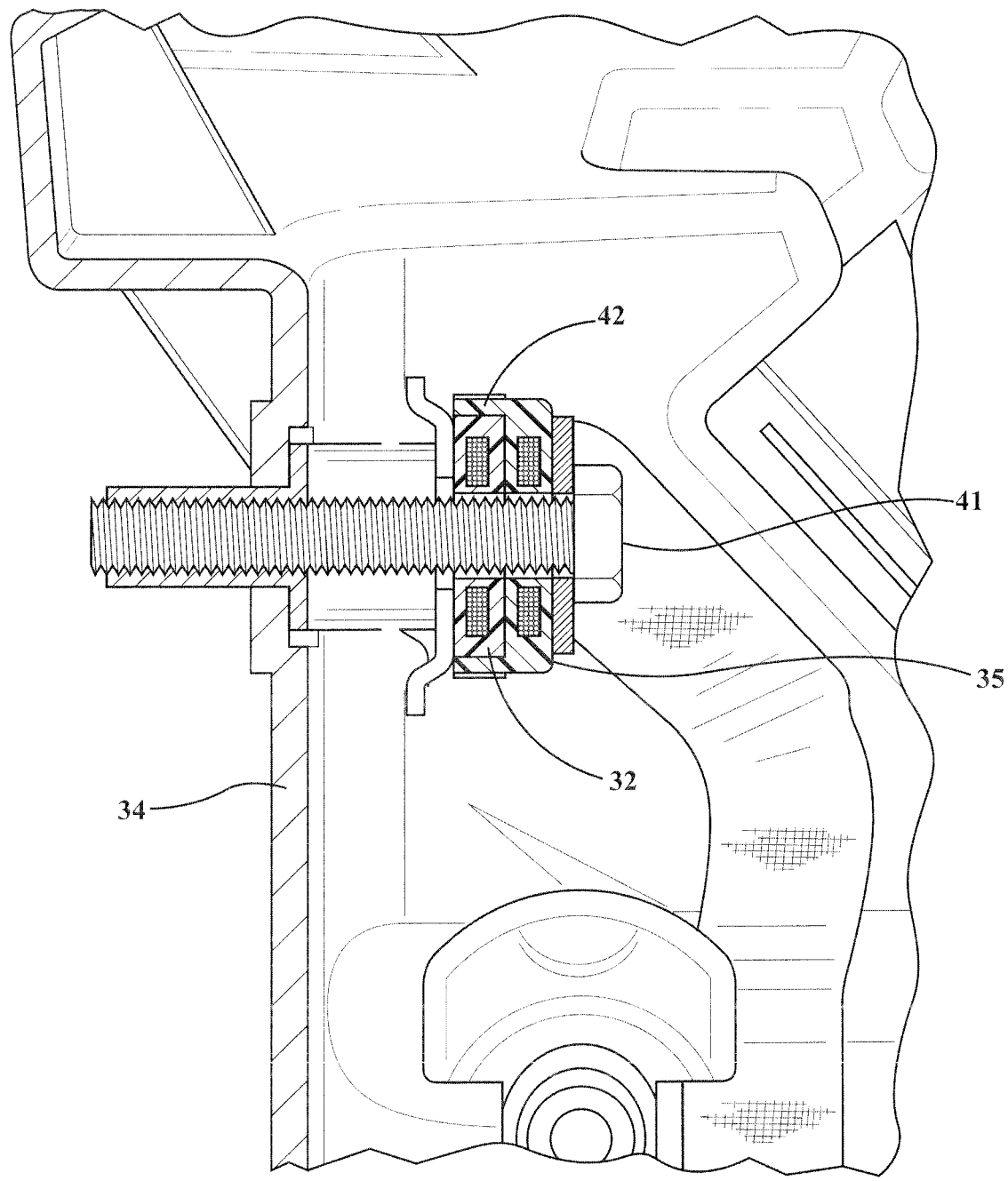
FIG. 14 is a cross sectional side perspective view taken alone section line 14-14 in FIG. 3.

As shown in the drawings generally and with particular reference to FIG. 14 the tether 28 has two over molded retainers 32, 35 at each end of the tether 28, which are also spaced apart creating a length of tether 107, 107' (shown in FIG. 9 and FIG. 2) at opposite ends of the tether 28. When connected to the structural inner panel 12 the length of tether 107, 107' of each end will overlap in the region of the motor housing 34 thereby providing additional strength in the region of the motor housing 34 so that if the motor housing 34 were to break away from the structural inner panel 12 in the event if an accident it will be held by one or both ends of the tether 28. Both of the over molded retainers have an aperture 40 formed through the respective over molded retainers 32, 35. The aperture 40 serves the purpose of receiving a fastener 41 that is used to connect the tether 28 to the structural inner panel 10 and the wiper motor housing 34. This allows the tether 28 used to also prevent the wiper motor housing 34 from detaching and flying away from the liftgate structure in the event of an accident. Two of the over molded retainers 32 are configured to be received in snap hooks 42 formed on the other of the over molded retainers 35. The snap hooks 42 are optional, but serve the purpose of aligning the aperture 40 in each of the over molded retainers 32, 35, which are aligned and receive a fastener 41 for connection of the tether 28. During assembly one end of the tether 28 remains in the wiper motor housing recess 18, while the other and of the tether 28 is passed through each of the friendly holes 26 and then enters back into the wiper motor housing recess 18 where the over molded retainers 32, 35 on the second end of the tether 28 are aligned with the over molded retainers 32, 35 of the first end of the tether 28. Thus both ends of the tether 28 are fastened together to the wiper motor housing 34 and to the structural inner panel 10 in the wiper motor housing recess 18. While the present embodiment of the invention describes the tether as being connected to the wiper motor housing 34, it is within the scope of this invention to be connected to other components and not necessarily the wiper motor housing. For example the tether 28 can be connected to the structural inner panel 10 itself, any or the brackets 20, 22, 24 or the ends of the tether 28 can be connected together and left loose, without being fastened to any of the components of the assembly.

Figure 8:
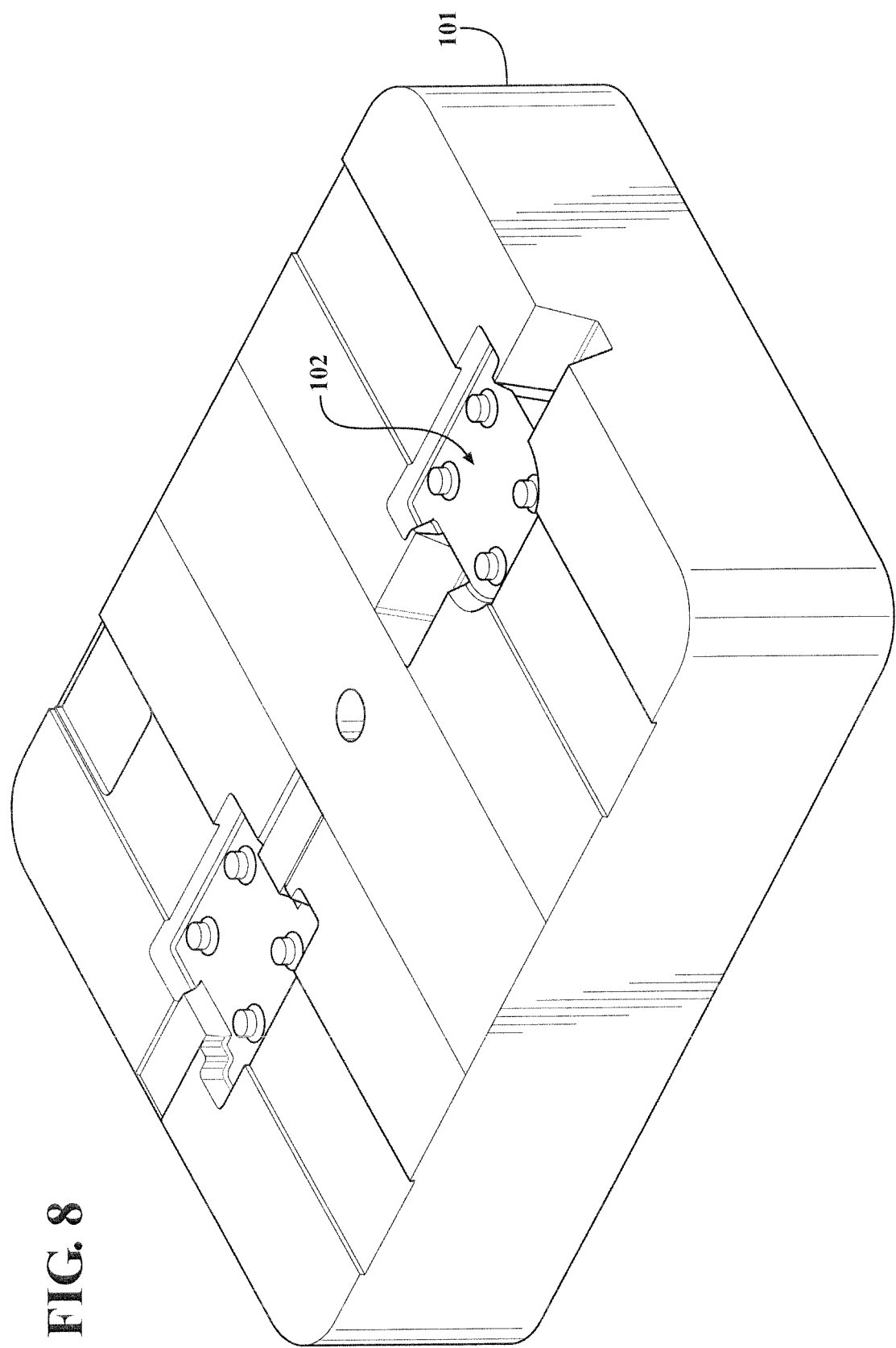
FIG. 8 is a top perspective view of the lower half of the mold machine cavity.
Figure 9:
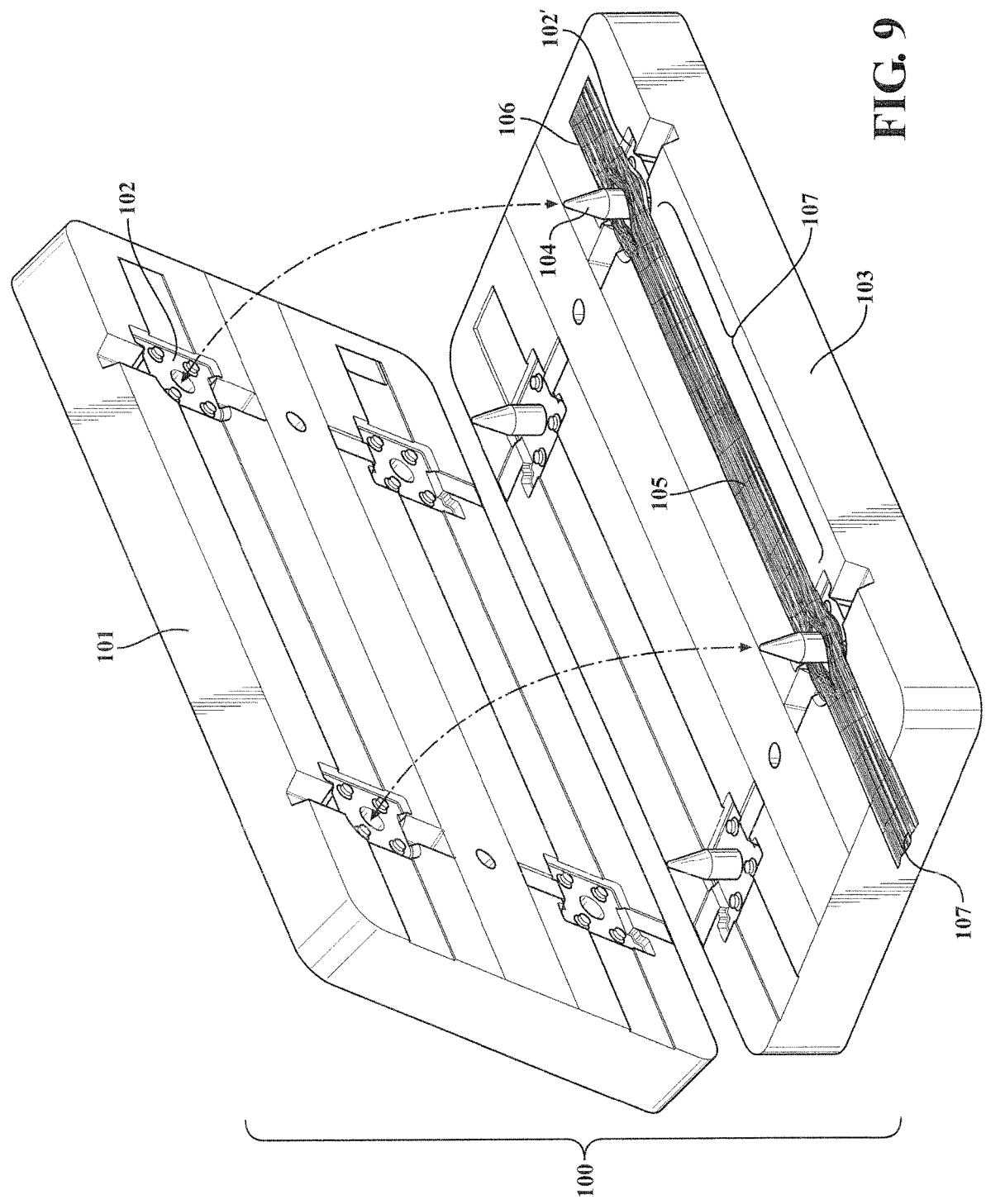
FIG. 9 is a side perspective schematic upper end view of the lower half of the mold machine cavity with two pin tools installed and positioned through the fiber strands of the tether prior to injection molding.

One of the problems encountered regarding the placement of retainers on fibrous tethers is that often retainers are pinched or crimped onto the tether 28. This causes breakage of the fibers, which weakens the strength of the tether 28. The method, according to the present invention increases the strength of the retainer 32, 35 and tether 28 by overmolding the retainer 32, 35 onto the tether 28 using injection molding techniques. Using this process the fibers are encapsulated with a molten resin, thereby maintaining their integrity and not breaking the fibers, which results in a stronger tether. Referring now to FIGS. 8 and 9 a method of overmolding a retainer onto the tether will now be discussed. FIG. 8 shows upper half 101, which is the upper half shown in FIG. 9, of an injection molding machine 100, which has a mold cavity 102 for receiving molten resin. FIG. 9 shows both the upper half 101 and lower half 103 of the injection molding machine 100. It is within the scope of the invention for the upper half 101 and the lower half 103 to be reversed depending on a particular application. The lower half 103 also has a mold cavity 102' that aligns with mold cavity 102 of upper half 101. The mold cavity 102' has a pin tool 104 extending from the surface of the mold cavity 102'. FIG. 9 also shows tether material 106 placed across the mold cavity 102' with the pin tool 104 sliding through the fibers of the tether material 106. The pin tool 104 is shaped to push the fibers aside without breaking the fibers. The pin tool 104 is configured to create the aperture in the over molded retainer, which is used to receive the fastener when attaching the finished tether to the liftgate.

Referring to FIGS. 8 and 9 the method includes the steps of providing an injection molding machine 100 having at least two mold pieces 101, 103 that form the mold cavity 102, 102' when the mold pieces are positioned in a mold closed position. Injection molding machine is operable to move the mold pieces between a mold open position and the mold closed position. The method also includes a step of providing an injection head, which is not shown, connected to the mold cavity for delivering molten resin to the mold cavity. There is also tether material that is formed into a tether, which has an elongated body made of fiber strands, where the body has two ends where the retainers are over molded near. Where the retainers are over molded onto the tether material will depend upon a particular application; however they are generally near each of the two ends sense as described above the two ends of the tether overlap during connection of the tether to the structural inner panel 10. Provided in the mold cavity 102, as discussed above are pin tools that extend from the surface of the mold cavity.

During the molding method a step of moving the mold pieces to the mold open position allows access to the mold cavity. Then during a step of loading the at least one of the two ends of the tether are loaded into the mold cavity by pushing the elongated body of the tether onto at least one of the plurality of pin tools. It is within the scope of this invention for multiple pin tools to be positioned within the mold cavity, or they may be positioned within separate mold cavities, which are part of the same injection molding machine. During the step of loading the tether each one of the plurality pin tool slide past the fiber strands so that the pin tool extends completely through the elongated body of the tether. Next the step of moving the mold pieces to the mold close position takes place, followed by injecting molten resin into the mold cavity and allowing the molten resin to cure and encapsulate portions of the fiber strands. During the step the over molded retainers are formed onto the tether and the plurality of pin tools cause the formation of a through hole through each of the over molded retainers. Finally the injection molding machine is opened and the completed tether with over molded retainers is removed.

Figure 10:
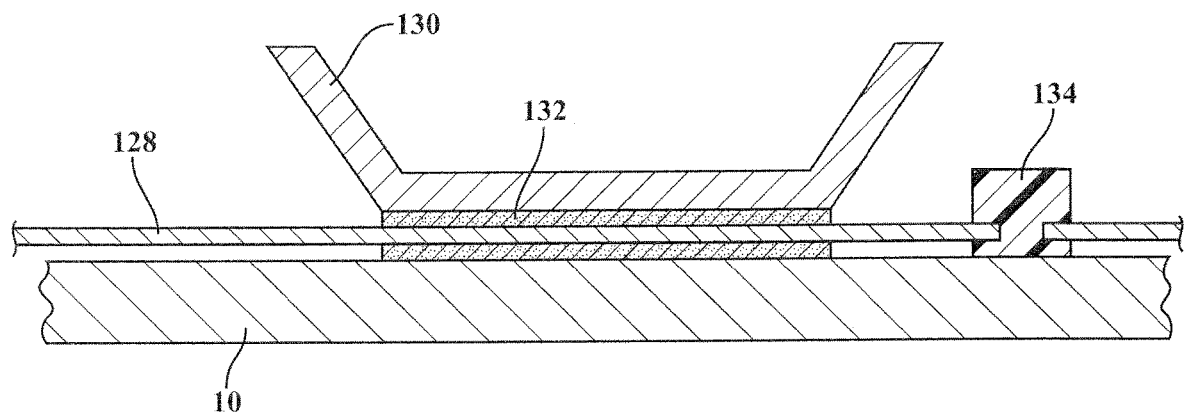
FIG. 10 is a side plan cross sectional view of an alternate embodiment of the tether connected to a liftgate using adhesives and an overmolded stopper.

Referring now to FIG. 10 an alternate embodiment of a tether 128 is shown being connected between the structural inner panel 10 and a structure 130. The structure 130 can be any type of bracket as shown in the previous figures, wiper motor housing or any type of component of the liftgate. In the present embodiment of the invention the tether 128 extends underneath the structure 130 and is bonded to the structural inner panel 10 and structure 130 using an adhesive 132. In the event that the tether 128 encounters a force strong enough to break the bond of the adhesive 132, the tether 128 has an over molded stop 134 formed on the tether 128 using the methods above. Over molded stop 134 is designed to come into contact with the structure 130 to prevent the tether 128 from sliding away from the structure 130 if the load exceeds adhesive strength.

Figure 11:
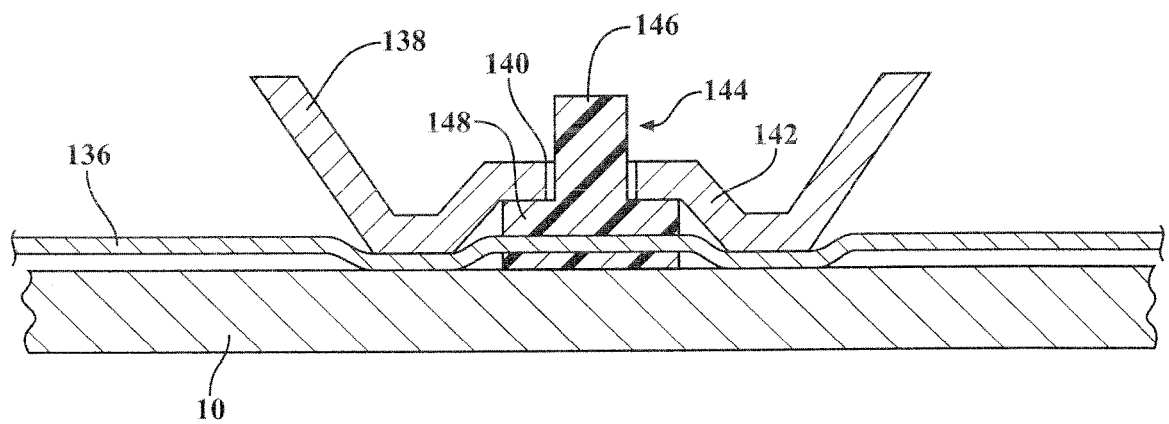
FIG. 11 is a side plan cross sectional view of an alternate embodiment of the tether connected to a liftgate by pinching the tether with a bracket having a trapping female flange for receiving a male overmolded stopper.

Referring now to FIG. 11 another alternate embodiment is shown. In this alternate embodiment there is a tether 136 pinched between the structural inner panel 10 and a structure 138 that has an aperture 140 and shoulder 142 for receiving an over molded stop 144 that has a neck 146 and a shoulder 148. The neck 146 is configured to slide through the aperture 140 and the shoulder 148 is configured to contact the shoulder 142 of the structure 138. In this embodiment of the invention the over molded stop 144 is aligned and held in place using the neck 146 extending through the aperture 140, while the shoulder 148 of the over molded stop 144 press against the shoulder 142 of the structure 138 to prevent the tether 136 from sliding away from the structure 138. Connection between the structure 138 and the structural inner panel 10 can be accomplished using different techniques including fasteners, adhesives, etc. The structure 138 can be any type of bracket as shown in the previous figures, or wiper motor housing or any type of component of the liftgate.

Figure 12:
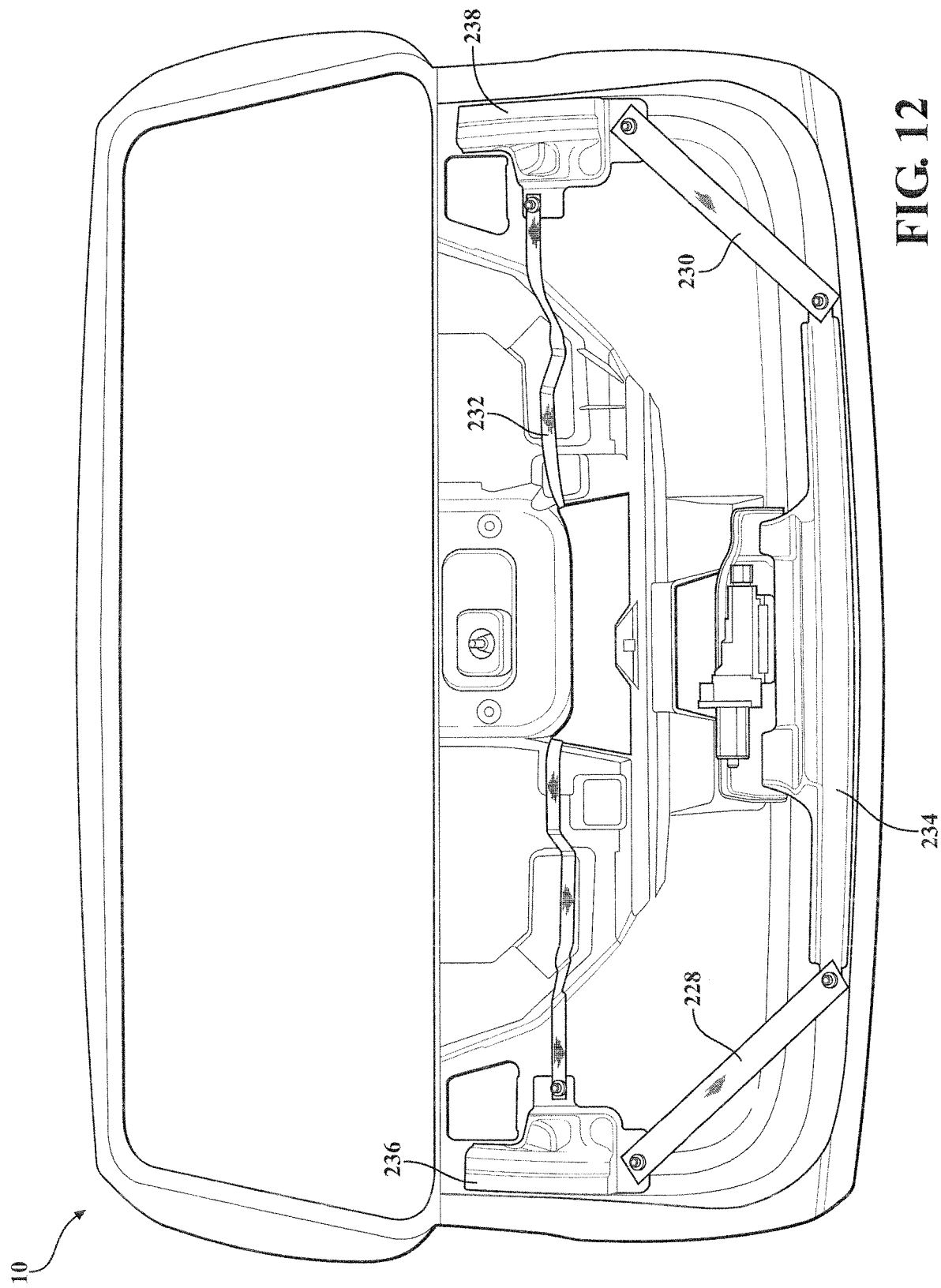
FIG. 12 is an end perspective view of an outside surface of a structural inner panel of a liftgate, having the three tethers connected to brackets in accordance with an alternate embodiment of the invention.

FIG. 12 shows an alternate embodiment of the invention where the structural inner panel 10 has three separate tethers 228, 230, 232. Tethers 228, 230 have a different width than tether 232, and extend between a center bracket 234 and side brackets 236, 238. Tether 232 extends between side brackets 236, 238 and has a more narrow width. Each tether 228, 230, 232 is connected at each end to a bracket using a fastener extending through an over molded retainer. However it is within the scope of this invention for each end of the tether 228, 230, 232 to be adhesively bonded and pinched behind the respective brackets. The difference between tethers 228, 230 and the tether 232 is the width, which results in the tethers having different strengths. This embodiment of the invention allows for different types of tethers to be used in a particular application, thereby providing different degrees of strength at different locations on the structural inner panel 10.

Figure 13:
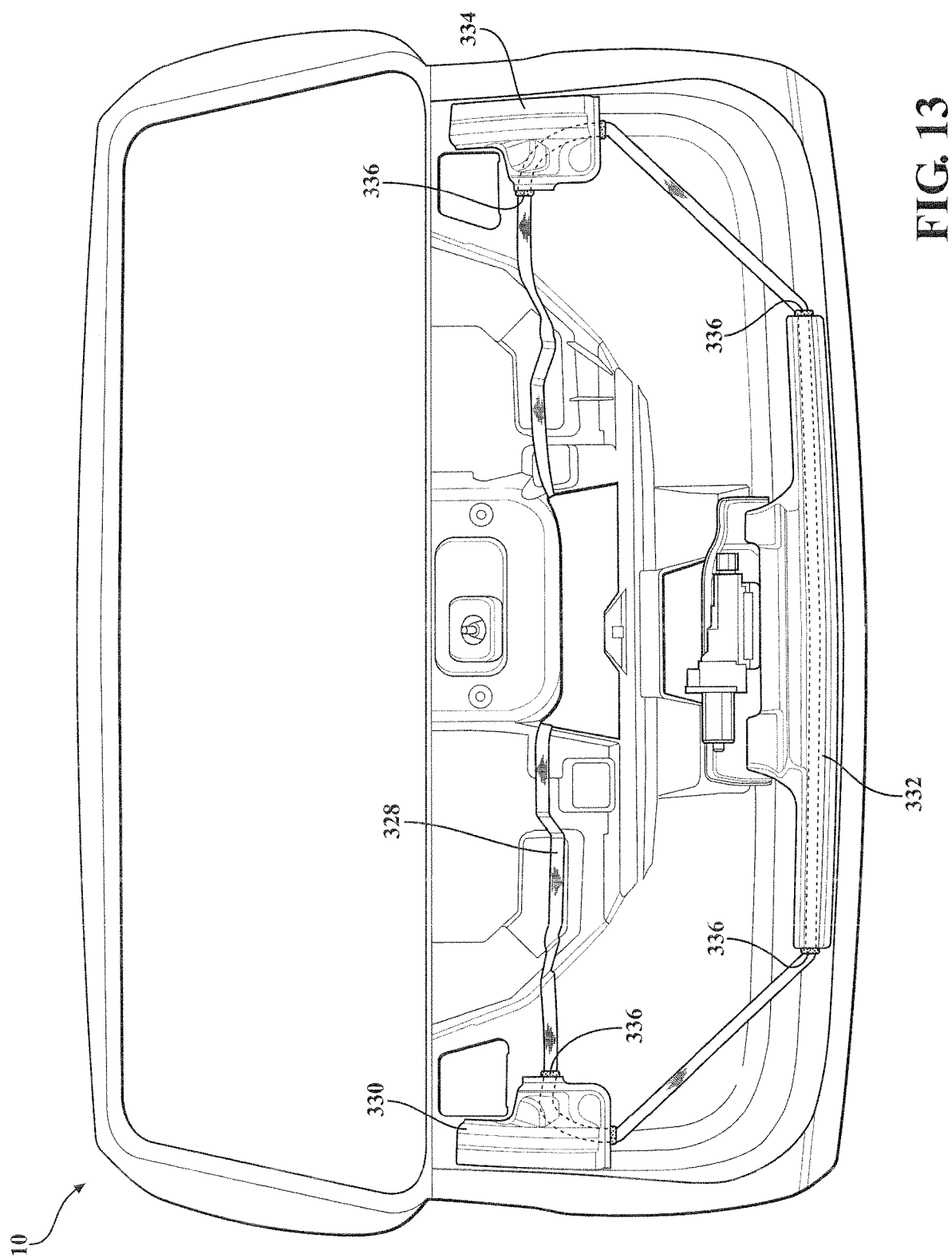
FIG. 13 is an end perspective view of an outside surface of a structural inner panel of a liftgate, having the three tethers connected to brackets in accordance with an alternate embodiment of the invention.

FIG. 13 shows another alternate embodiment of the invention. In this particular embodiment of the invention the structural panel 10 is reinforced with a single tether 328. The single tether 328 is connected to the structural inner panel 10 at brackets 330, 332, 334. The single tether 328 is connected to the structural inner panel 10 by pinching the tether 328 behind each of the brackets 330, 332, 334; which are connected to the structural inner panel 10 using fastener adhesives or other attachment mechanisms. Additionally, as shown the tether 328 is also bonded to the structural inner panel 10 using an adhesive 336 in the area behind each of the brackets 330, 332, 334.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liftgate structure, comprising:
a structural inner panel with an outside surface and an inner surface having a lower perimeter surface area extending across substantially the entire width of the structural inner panel, the structural inner panel including a wiper motor housing recess formed on the inner surface;
a plurality of brackets connected to the outside surface of the structural inner panel, each of the plurality of brackets having at least one friendly hole; and
a tether having two ends each having at least one over molded retainer for connecting the tether to a wiper motor housing that is connected to the wiper motor housing recess, wherein the tether is positioned through each of the at least one friendly hole of each of the plurality of brackets.

2. The liftgate structure of claim 1 wherein the tether has slack through each of the at least one friendly holes that allow the tether to flex and move in the event of a crash that breaks the structural inner panel into pieces.

3. The liftgate structure of claim 2 wherein each of the plurality of brackets is located in a tether reinforcement zone, wherein the tether reinforcement zone is an area of the structural inner panel having greater structural strength than portions of the structural inner panel that are not located in the tether reinforcement zone.

4. The liftgate structure of claim 1, wherein the tether is white in color to allow for easier visual inspection.

5. The liftgate structure of claim 1, wherein the tether is made of elongated fiber strands extending along the length of the tether in a parallel orientation, wherein the elongated fiber strands are held together by cross strands.

6. The liftgate structure of claim 5, wherein the elongated fiber strands comprise one of the group consisting of glass fibers, carbon fibers, metal strands and aramid fibers.

7. The liftgate structure of claim 1, wherein the at least one over molded retainer at a first one of the two ends has snaps hooks formed thereon that grasps and holds the at least one over molded retainer at a second one of the two ends.

8. The liftgate structure of claim 1, wherein the at least one over molded retainer has an aperture formed through the at least one over molded retainer for receiving a fastener that is used to connect the tether to the structural inner panel.

9. A liftgate structure, comprising:
a structural inner panel with an outside surface and an inner surface having a lower perimeter surface area extending across substantially the entire width of the liftgate structure, the structural inner panel including a wiper motor housing recess formed on the inner surface;
a plurality of brackets connected to the outside surface of the structural inner panel, each of the plurality of brackets are bonded to the structural inner panel with an adhesive; and
a tether having two ends each having at least one over molded retainer for connecting the tether to a wiper motor housing, wherein the tether is pinched behind each one of the plurality of brackets and bonded with the adhesive between each one of the plurality of brackets and the structural inner panel.

10. The liftgate structure of claim 9 wherein each of the plurality of brackets is located in a tether reinforcement zone, wherein the tether reinforcement zone is an area of the structural inner panel having greater structural strength than portions of the structural inner panel that are not located in the tether reinforcement zone.

11. The liftgate structure of claim 9, wherein the tether is white in color to allow for easier visual inspection.

12. The liftgate structure of claim 9, wherein the tether is made of elongated fiber strands extending along the length of the tether in a parallel orientation, wherein the elongated fiber strands are held together by cross strands.

13. The liftgate structure of claim 12, wherein the elongated fiber strands comprise one of the group consisting of glass fibers, carbon fibers, metal strands and aramid fibers.

14. The liftgate structure of claim 9, wherein one of the at least one over molded retainer at a first one of the two ends has snaps hooks formed thereon that grasps and holds the at least one over molded retainer at a second one of the two ends.

15. The liftgate structure of claim 9, wherein the at least one over molded retainer has an aperture formed through the at least one over molded retainer for receiving a fastener that is used to connect the tether to the structural inner panel.

* * * * *